United States Patent
Shaw et al.

(10) Patent No.: US 11,115,824 B1
(45) Date of Patent: Sep. 7, 2021

(54) 5G CYBERSECURITY PROTECTION SYSTEM

(71) Applicant: T-Mobile USA, Inc., Bellevue, WA (US)

(72) Inventors: Venson Shaw, Kirkland, WA (US); Sunil Lingayat, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/874,641

(22) Filed: May 14, 2020

(51) Int. Cl.
| | |
|---|---|
| *H04M 3/16* | (2006.01) |
| *H04W 12/122* | (2021.01) |
| *H04W 60/00* | (2009.01) |
| *H04L 12/24* | (2006.01) |
| *H04W 12/08* | (2021.01) |
| *H04W 8/18* | (2009.01) |
| *H04W 84/04* | (2009.01) |

(52) U.S. Cl.
CPC ........... *H04W 12/122* (2021.01); *H04L 41/06* (2013.01); *H04W 8/18* (2013.01); *H04W 12/08* (2013.01); *H04W 60/00* (2013.01); *H04W 84/042* (2013.01)

(58) Field of Classification Search
CPC ..... H04W 12/122; H04W 60/00; H04W 8/18; H04W 12/08; H04W 84/042; H04L 41/06
USPC ......................................................... 455/411
See application file for complete search history.

(56) References Cited

U.S. PATENT DOCUMENTS

| | | |
|---|---|---|
| 7,676,841 B2 | 3/2010 | Sobchuk et al. |
| 8,391,834 B2 | 3/2013 | Raleigh |
| 8,448,257 B2 | 5/2013 | Garcia et al. |
| 8,621,553 B2 | 12/2013 | Syed et al. |
| 8,667,148 B1 | 3/2014 | Turner |
| 8,667,556 B2 | 3/2014 | Chang et al. |
| 8,873,407 B2 | 10/2014 | Burbidge et al. |
| 9,152,789 B2 | 10/2015 | Natarajan et al. |
| 9,154,479 B1 | 10/2015 | Sethi |
| 9,210,180 B2 | 12/2015 | Zisapel et al. |
| 9,250,887 B2 | 2/2016 | Lucovsky et al. |
| 9,262,127 B2 | 2/2016 | Patrick |
| 9,363,278 B2 | 6/2016 | Maria |
| 9,503,463 B2 | 11/2016 | Karta et al. |

(Continued)

FOREIGN PATENT DOCUMENTS

| | | |
|---|---|---|
| CN | 101764799 B | 11/2014 |
| CN | 102484783 B | 11/2014 |

(Continued)

*Primary Examiner* — Amancio Gonzalez
(74) *Attorney, Agent, or Firm* — Perkins Coie LLP (57) ABSTRACT

The disclosed technology includes a method and system for preventing or reducing cyber-attacks in a 5G network. The system can register a connected device with the 5G network, monitor the connected device by the computing device associated with the 5G network, and detect or determine that the connected device is at risk of a cyber-attack based on one or more conditions. The conditions can include detecting that the connected device is obsolete or unmaintained, the connected device fails to respond to status checks, or a service provider associated with the connected device is not supporting the connected device or is out of business. In response to detecting or determining that the connected device is at risk of the cyber-attack, the system can deauthorize the connected device.

17 Claims, 7 Drawing Sheets

(56) References Cited

U.S. PATENT DOCUMENTS

| | | |
|---|---|---|
| 9,558,677 B2 | 1/2017 | Sadeh-koniecpol et al. |
| 9,584,517 B1 | 2/2017 | Roth et al. |
| 9,591,003 B2 | 3/2017 | Johansson et al. |
| 9,591,556 B2 | 3/2017 | Ventimiglia et al. |
| 9,659,251 B2 | 5/2017 | Tang et al. |
| 9,661,009 B1 | 5/2017 | Karandikar et al. |
| 9,680,855 B2 | 6/2017 | Schultz et al. |
| 9,710,664 B2 | 7/2017 | Sathyadevan et al. |
| 9,712,549 B2 | 7/2017 | Almurayh |
| 9,742,690 B2 | 8/2017 | Parikh et al. |
| 9,772,831 B2 | 9/2017 | Lucovsky et al. |
| 9,781,205 B2 | 10/2017 | Batrouni et al. |
| 9,825,991 B2 | 11/2017 | Ivanchykhin et al. |
| 9,832,719 B2 | 11/2017 | Horn et al. |
| 9,838,408 B1 | 12/2017 | Karandikar et al. |
| 9,872,233 B2 | 1/2018 | Jeon et al. |
| 9,930,058 B2 | 3/2018 | Carpenter et al. |
| 9,930,061 B2 | 3/2018 | Zandani |
| 9,954,902 B1 | 4/2018 | Sethi |
| 10,044,719 B2 | 8/2018 | Desai et al. |
| 10,050,989 B2 | 8/2018 | Ng et al. |
| 10,193,919 B2 | 1/2019 | Chesla |
| 10,218,725 B2 | 2/2019 | Kim |
| 10,237,286 B2 | 3/2019 | Sharma et al. |
| 10,306,697 B2 | 5/2019 | Wang et al. |
| 10,320,766 B2 | 6/2019 | Chen et al. |
| 10,348,747 B2 | 7/2019 | Yamada et al. |
| 10,349,313 B2 | 7/2019 | Chen et al. |
| 10,454,950 B1 * | 10/2019 | Aziz .................. H04L 63/1441 |
| 10,873,594 B2 | 12/2020 | Ekambaram |
| 10,999,776 B2 * | 5/2021 | Jagannatha ......... H04L 41/0893 |
| 2006/0072527 A1 | 4/2006 | Beck et al. |
| 2006/0174342 A1 | 8/2006 | Zaheer et al. |
| 2007/0274524 A1 | 11/2007 | Ksontini et al. |
| 2007/0298720 A1 | 12/2007 | Wolman et al. |
| 2012/0005724 A1 | 1/2012 | Lee |
| 2014/0090060 A1 | 3/2014 | Hart |
| 2014/0241317 A1 | 8/2014 | Jamadagni et al. |
| 2014/0259095 A1 | 9/2014 | Bryant |
| 2016/0110819 A1 | 4/2016 | Abramowitz |
| 2016/0226893 A1 | 8/2016 | Warikoo et al. |
| 2016/0262069 A1 | 9/2016 | Parsay et al. |
| 2017/0070480 A1 | 3/2017 | Blumenfeld et al. |
| 2017/0279843 A1 | 9/2017 | Schultz et al. |
| 2017/0346846 A1 | 11/2017 | Findlay |
| 2018/0020021 A1 | 1/2018 | Gilmore et al. |
| 2018/0183827 A1 | 6/2018 | Zorlular et al. |
| 2018/0359274 A1 | 12/2018 | Barahona et al. |
| 2019/0036958 A1 | 1/2019 | Shi |
| 2019/0128936 A1 * | 5/2019 | Brown .................. G01R 27/28 |
| 2019/0228110 A1 * | 7/2019 | Yan ......................... G06F 30/00 |
| 2019/0260785 A1 | 8/2019 | Jenkinson et al. |
| 2019/0306188 A1 * | 10/2019 | Medvedovsky .... H04L 61/1511 |
| 2019/0312887 A1 | 10/2019 | Grimm et al. |
| 2019/0380037 A1 * | 12/2019 | Lifshitz ................. H04L 43/12 |
| 2020/0239273 A1 * | 7/2020 | Hanninen ............... H04L 67/12 |
| 2020/0320208 A1 | 10/2020 | Bhosale et al. |
| 2020/0328885 A1 * | 10/2020 | Tola ..................... H04L 9/3271 |

FOREIGN PATENT DOCUMENTS

| | | |
|---|---|---|
| CN | 108370370 A | 8/2018 |
| CN | 104185278 B | 12/2018 |
| CN | 109548099 A | 3/2019 |
| CN | 104170469 B | 6/2019 |
| CN | 110213226 A | 9/2019 |
| EP | 2421300 B1 | 10/2014 |
| EP | 3161656 A1 | 5/2017 |
| EP | 3354063 A1 | 8/2018 |
| EP | 3358800 A1 | 8/2018 |
| EP | 3416148 A1 | 12/2018 |
| EP | 2640143 B1 | 7/2019 |
| EP | 3317804 B1 | 7/2019 |
| EP | 3287927 B1 | 11/2019 |
| JP | 2015507434 A | 3/2015 |
| JP | 2018537912 A | 12/2018 |
| JP | 2019097133 A | 6/2019 |
| JP | 6626002 B2 | 12/2019 |
| KR | 20050026624 A | 3/2005 |
| KR | 100776828 B1 | 11/2007 |
| KR | 101579021 B1 | 12/2015 |
| KR | 101681855 B1 | 12/2016 |
| KR | 20180098251 A | 9/2018 |
| KR | 20180127221 A | 11/2018 |
| KR | 102037701 B1 | 11/2019 |
| WO | 2008128040 A1 | 10/2008 |
| WO | 2009096833 A1 | 8/2009 |
| WO | 2011147462 A1 | 12/2011 |
| WO | 2012037637 A1 | 3/2012 |
| WO | 2013166126 A1 | 11/2013 |
| WO | 2016064919 A1 | 4/2016 |
| WO | 2016178605 A1 | 11/2016 |
| WO | 2017011827 A1 | 1/2017 |
| WO | 2017189176 A2 | 11/2017 |
| WO | 2018004434 A1 | 1/2018 |
| WO | 2018158643 A1 | 9/2018 |
| WO | 2019028211 A1 | 2/2019 |

* cited by examiner

5G CYBERSECURITY PROTECTION SYSTEM

BACKGROUND 5G is the fifth generation of wireless communications technology supporting cellular data networks. The frequency spectrum of 5G is divided into millimeter waves, mid-band and low-band. Low-band uses a similar frequency range as its predecessor, 4G. 5G millimeter wave is the fastest, with actual speeds often being 1-2 Gbit/s down. Frequencies are above 24 GHz reaching up to 72 GHz which is above the extremely high frequency band's lower boundary. Compared to 4G, the reach is short, so more cells are required. Millimeter waves have difficulty traversing many walls and windows, so indoor coverage is limited. 5G mid-band is the most widely deployed.

5G wireless networks support numerous different types of communications that provide ultrahigh-speed service delivery and connect a massive number of devices. For example, 5G networks support massively interconnected Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC), and the like. Each of these communication types may have different transmission and latency requirements, and 5G networks can require efficient allocation of resources while minimizing conflicts and interference.

5G networks support a massive number of connected devices. They enable a huge increase of bandwidth over LTE, and create a threat landscape that is different from previous networks. Security challenges stem from the very attributes that make 5G such an improvement. For example, many Internet-of-Things ("IoT") devices and cloud Radio Access Network ("RAN") devices are connected in rogue rural area networks that are unsecure. Although the majority of interconnected devices on networks are safe, dependable, and reliable, 5G wireless networks create a greater number of vulnerabilities compared to other communications networks. However, the vulnerabilities cannot be addressed with conventional network hardening techniques because deployment across a massively diverse network of devices is costly, impractical to implement, and resource intensive.

BRIEF DESCRIPTION OF THE DRAWINGS

Embodiments of the present technology will be described and explained through the use of the accompanying drawings.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION 5G will vastly increase the number of devices accessing service provider networks. Many of these connected devices (e.g., Narrowband ("NB") Internet-of-Things ("IoT") devices, cloud Radio Access Network ("RAN") devices) are low cost and low performance, creating risks from at least three different entities for billions of these devices. For example, at a first layer, manufacturers of the connected devices can create an imperfect product to begin with and can fail to update software and hardware as needed, creating vulnerabilities. In another example, at a second layer, service providers of these connected devices can go out of business or provide a lower level of service (e.g., after a transaction such as an acquisition), leaving the devices unsupervised and vulnerable to attack. Additionally, users of these devices may abandon the device (e.g., upgrade to a new device) but leave the device able to connect to 5G network. Left unsupervised, these products will be vulnerable to cyber-attacks that could in turn cause the 5G network to be vulnerable to cyber-attacks. For example, hacked connected devices can cause a registration storm for signaling traffic, launch a distributed denial-of-service (DDoS) attack (e.g., malicious attempt to disrupt normal traffic of a targeted server, service or network by overwhelming the target or its surrounding infrastructure with a flood of Internet traffic), or create other malicious cyber-attacks. Thus, given the number of devices connecting to the 5G network (and therefore the number of access points) coupled with the vulnerabilities introduced by low-cost connected devices, additional cybersecurity measures are needed.

To address the aforementioned concerns, the disclosed technology registers connected devices (e.g., IoT devices, cloud RAN devices) and monitors the connected devices to determine whether the device presents a risk of being compromised (e.g., device is obsolete, unmaintained, abandoned). Upon detecting that the connected device is at risk of being compromised (e.g., not responding to status checks, determining that the provider is no longer operating), the system intelligently deauthorizes the device. Registering can include, for example, creating a device fingerprint. Deauthorizing can include various levels of deauthorization in response to a perceived threat level (e.g., disabling the device from an application, driver, cell tower, core network, wiping the operating system, temporarily disabling the device until the system confirms that the device is not a threat). The portion of the 5G network performing the detecting and deauthorizing can vary between the core network, the application server, and the intelligent gNodeB ("gNB") (e.g., network equipment that transmits and receives wireless communications between user equipment and the mobile network) in the RAN. Such a process hardens a 5G network by dynamically deploying security resources to address vulnerabilities.

In a further implementation, an intelligent gNB in the RAN can detect potential cybersecurity vulnerabilities and alert other towers. In some cases, the towers can share information to detect a potential threat and send deauthorization messages.

In a further implementation, the disclosed technology uses a personalized signature to prevent cyber-attacks. The personalized signature can be determined by the network (e.g., using patterns of the device) or can be sourced from the device itself (e.g., a password, passphrase, port, protocol, time signature, ambient information). A potential hacker would not be allowed to access the network via the device without knowing the personalized signature (e.g., if the device did not send a message at the appointed time, if the device deviates from typical behavior, etc.).

Thus, the described 5G security solution can safeguard the 5G network infrastructure by identifying and deauthorizing at-risk connected devices. This is done using various detection techniques (e.g., personalized signatures, gNB information sharing) and by intelligent deauthorizing any compromised IoT devices. Additional techniques are described in related applications including U.S. patent application Ser. No. 16/874,649, filed May 14, 2020, entitled "5G Cybersecurity Protection System Using Personalized Signatures," U.S. patent application Ser. No. 16/874,659, filed May 14, 2020, entitled "Intelligent gNodeB Cybersecurity Protection System," and Ser. No. 16/849,224, filed Apr. 15, 2020, entitled "Self-Cleaning Function for a Network Access Node of a Network", each of which are incorporated by reference in their entireties for all purposes.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

Figure 1:
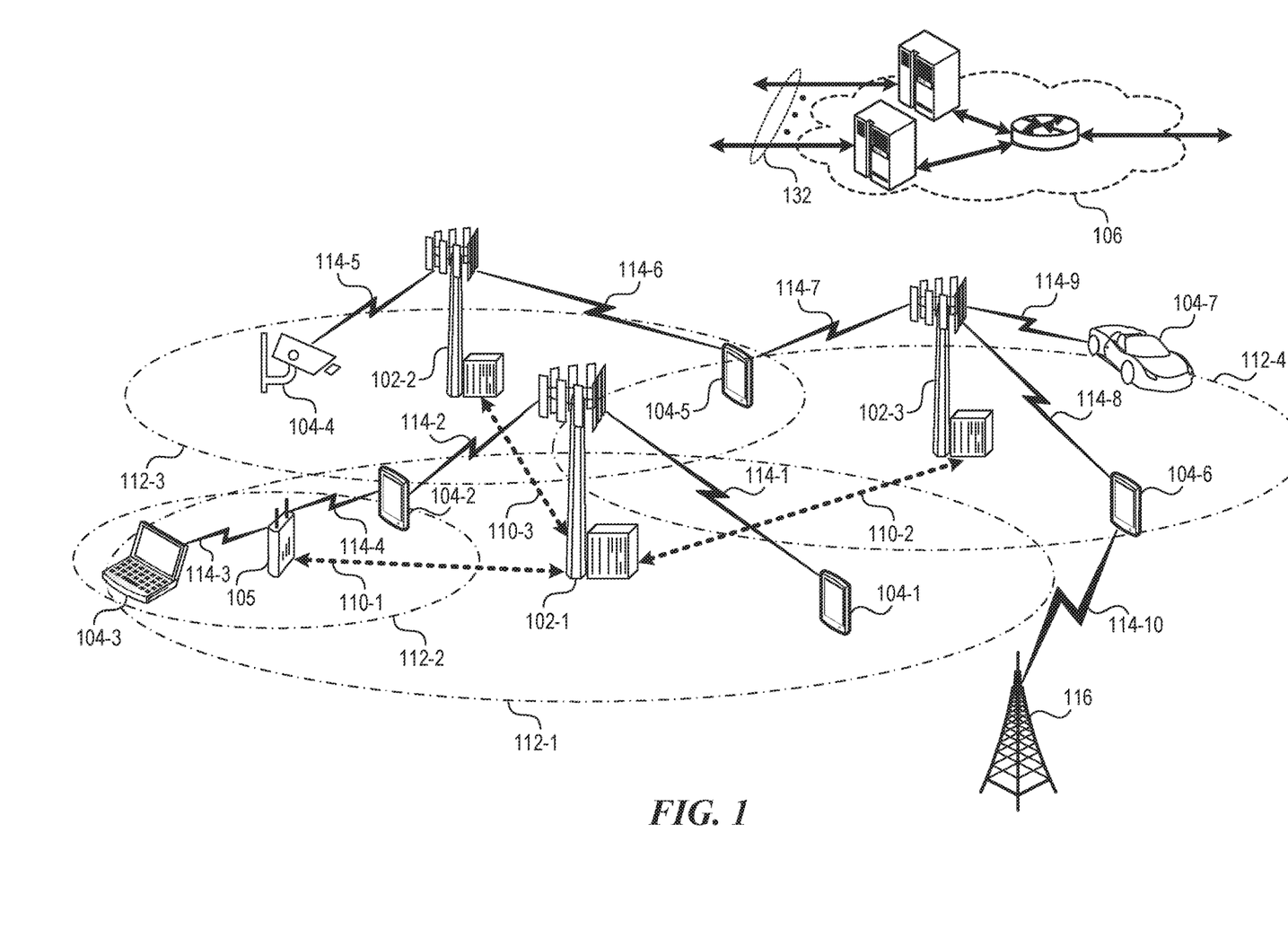
FIG. 1 is a diagram that illustrates a 5G wireless communication system according to some embodiments of the present disclosure.

FIG. 1 is a block diagram that illustrates a wireless communication system 100 according to some embodiments of the present disclosure. The wireless communications system 100 includes base stations 102-1 through 102-3 (individually referred to as "base station 102" or collectively referred to as "base stations 102"), UEs 104-1 through 104-7 (individually referred to as "UE 104" or collectively referred to as "UEs 104"), and a core network 106. The UEs 104-1 through 104-7 are capable of communication using 5G connectivity. For example, a 5G communication channel may use mmW access frequencies of 28 GHz. In some embodiments, the UE 104 may be operatively coupled to a base station 102 over an LTE/LTE-A communication channel, which is referred to as a 4G communication channel. Therefore, although the disclosed embodiments primarily relate to a 5G connectivity, the embodiments can also apply to 4G or other forms of connectivity. As used in this disclosure, "connected device" includes UEs.

The core network 106 may provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1) and can perform radio configuration and scheduling for communication with the UEs 104, or can operate under the control of a base station controller (not shown). In some examples, the base stations 102 may communicate, either directly or indirectly (e.g., through core network 106), with each other over a second set of backhaul links 110-1 through 110-3 (e.g., X1), which may be wired or wireless communication links.

The base stations 102 may wirelessly communicate with the UEs 104 via one or more base station antennas. Each of the base station 102 sites can provide communication coverage for a respective geographic coverage area 112 (coverage areas 112-1 through 112-4, individually referred to as "coverage area 112" or collectively as "coverage areas 112"). The base stations 102 can be referred to as a base transceiver station, a radio base station, an access point, a radio transceiver, a gNodeB (gNB), NodeB, eNodeB (eNB), Home NodeB, a Home eNodeB, or some other suitable terminology. The geographic coverage area 112 for a respective base station 102 may be divided into sectors making up only a portion of the coverage area (not shown). The wireless communications system 100 may include base stations 102 of different types (e.g., macro and/or small cell base stations). In some embodiments, there may be overlapping geographic coverage areas 112 for different application environments (e.g., Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC)).

In some embodiments, the wireless communications system 100 can include one or more of a 5G network, an LTE/LTE-A network, etc. For example, in an LTE/LTE-A network, the term eNB is used to describe the base stations 102 and, in 5G or New Radio (NR) networks, the term gNBs is used to describe the base stations 102. The term UE is generally used to describe the UEs in 5G or LTE/LTE-A networks. The wireless communications system 100 may be a heterogeneous network in which different types of base stations provide coverage for various geographical regions. For example, each base station 102 may provide communication coverage for a macro cell, a small cell, and/or other types of cell. The term "cell" is used in 3GPP and relates to a base station, a carrier or component carrier associated with the base station, or a coverage area (e.g., sector) of a carrier or base station, depending on context. The wireless communications system 100 can be or include a millimeter wave communication network (e.g., WiGig).

A macro cell generally covers a relatively large geographic area (e.g., several kilometers in radius) and may allow unrestricted access by UEs with service subscriptions with the network provider. A small cell is a lower-powered base station, as compared with a macro cell, and may operate in the same or different (e.g., licensed, unlicensed) frequency bands as macro cells. Examples of small cells include pico cells, femto cells, and micro cells. A pico cell may cover a relatively smaller geographic area and may allow unrestricted access by UEs with service subscriptions with the network provider. A femto cell covers a relatively small geographic area (e.g., a home) and may provide restricted access by UEs having an association with the femto cell (e.g., UEs in a closed subscriber group (CSG), UEs for users in the home). A base station may support one or multiple (e.g., two, three, four, and the like) cells (e.g., component carriers).

The communication networks that can accommodate some of the various disclosed examples can be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 104 and the base stations 102 or core network 106 supporting radio bearers for the user plane data. At the Physical (PHY) layer, the transport channels may be mapped to Physical channels.

As illustrated, the UEs 104 are dispersed throughout the wireless communications system 100, where each UE 104 can be stationary or mobile. A UE 104 may also include or be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or the like. A UE can be a mobile phone, a personal digital assistant (PDA), a wireless modem, a wireless communication device, a handheld device, a tablet computer, a laptop computer, a cordless phone, a wireless local loop (WLL) station, wearable computers, other connected device (e.g., thermostat, appliances, garage door, doorbell, sprinkler system, vehicle), device connected via cloud RAN, or the like. A UE may be able to communicate with various types of base stations and network equipment including macro eNBs/gNBs, small cell eNBs/gNBs, relay base stations, and the like. A UE may also be able to communicate with other UEs either within or outside the same coverage area of a base station via device-to-device (D2D) communications.

The communication links 114-1 through 114-10 (individually referred to as "communication link 114" or collectively as "communication links 114") shown in wireless communications system 100 may include uplink (UL) transmissions from a UE 104 to a base station 102, and/or downlink (DL) transmissions, from a base station 102 to a UE 104. The downlink transmissions may also be called forward link transmissions while the uplink transmissions may also be called reverse link transmissions. Each communication link 114 may include one or more carriers, where each carrier may be a signal composed of multiple sub-carriers (e.g., waveform signals of different frequencies) modulated according to the various radio technologies described above. Each modulated signal may be sent on a different sub-carrier and may carry control information (e.g., reference signals, control channels), overhead information, user data, etc. The communication links 114 may transmit bidirectional communications using FDD (e.g., using paired spectrum resources) or TDD operation (e.g., using unpaired spectrum resources). In some embodiments, the communication links 114 can include an LTE communication link or a millimeter wave (mmW) communication link.

In some embodiments of the system 100, base stations 102 and/or UEs 104 may include multiple antennas for employing antenna diversity schemes to improve communication quality and reliability between base stations 105 and UEs 115. Additionally, or alternatively, base stations 105 and/or UEs 115 may employ multiple-input, multiple-output (MIMO) techniques that may take advantage of multi-path environments to transmit multiple spatial layers carrying the same or different coded data.

In some embodiments, the UE 104 is capable of communicating signals via the LTE network and an mmW system (e.g., as a part of a 5G/NR system). Accordingly, the UE 104 can communicate with the base station 102 over an LTE link. Additionally, the UE 104 can communicate with a connection point (CP), a base station (BS) (capable of mmW system communication), or a millimeter wave base station (mmW-BS) 116 over an mmW link. In another example, at least one of the base stations 102 may be capable of communicating signals via the LTE network and the mmW system over one or more communication links 114. As such, a base station 116 may be referred to as an LTE+mmW eNB or gNB or as an LTE+mmW CP/BS/mmW-BS.

Figure 2:
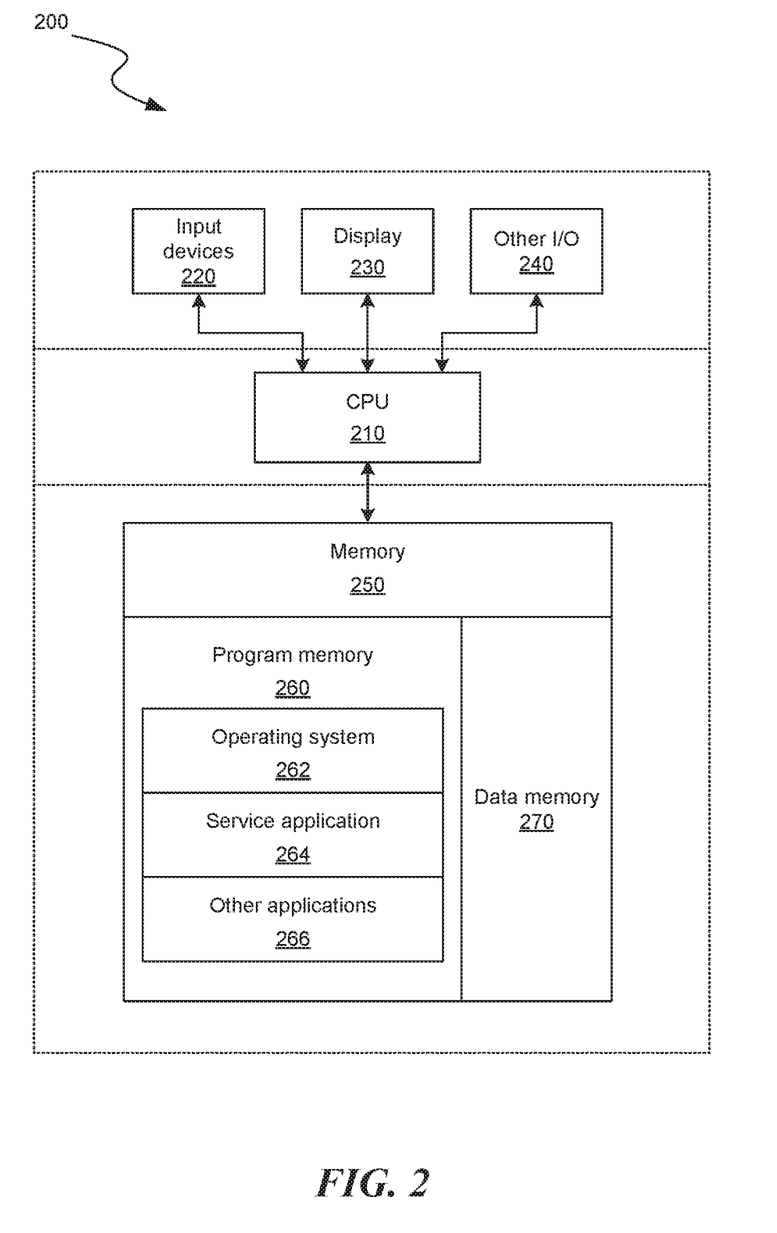
FIG. 2 is a block diagram illustrating an overview of devices on which some implementations can operate.

FIG. 2 is a block diagram illustrating an overview of devices on which some implementations of the disclosed technology can operate. The devices can comprise hardware components of a device 200 such as UE 104. Device 200 can include one or more input devices 220 that provide input to the CPU (processor) 210, notifying it of actions. The actions are typically mediated by a hardware controller that interprets the signals received from the input device and communicates the information to the CPU 210 using a communication protocol. Input devices 220 include, for example, a mouse, a keyboard, a touchscreen, an infrared sensor, a touchpad, a wearable input device, a camera- or image-based input device, a microphone, or other user input devices.

CPU 210 can be a single processing unit or multiple processing units in a device or distributed across multiple devices. CPU 210 can be coupled to other hardware devices, for example, with the use of a bus, such as a PCI bus or SCSI bus. The CPU 210 can communicate with a hardware controller for devices, such as for a display 230. Display 230 can be used to display text and graphics. In some examples, display 230 provides graphical and textual visual feedback to a user. In some implementations, display 230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 240 can also be coupled to the processor, such as a network card, video card, audio card, USB, FireWire or other external device, camera, printer, speakers, CD-ROM drive, DVD drive, disk drive, or Blu-Ray device.

In some implementations, the device 200 also includes a communication device capable of communicating wirelessly or wire-based with a network node. The communication device can communicate with another device or a server through a network using, for example, TCP/IP protocols. Device 200 can utilize the communication device to distribute operations across multiple network devices.

The CPU 210 can have access to a memory 250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 250 can include program memory 260 that stores programs and software, such as an operating system 262, service application, and other application programs 266. Memory 250 can also include data memory 270 that can include historical use or service of the device, historical connections to the 5G network, a user profile, a creator or owner of the device, a version of the software, a token or key associated with connecting to the 5G network, etc., which can be provided to the program memory 260 or any element of the device 200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, connected devices (e.g., appliances, sprinkler systems), multiprocessor systems, microprocessor-based systems, set-top boxes, programmable consumer electronics, network PCs, minicomputers, mainframe computers, distributed computing environments that include any of the above systems or devices, or the like.

Figure 3:
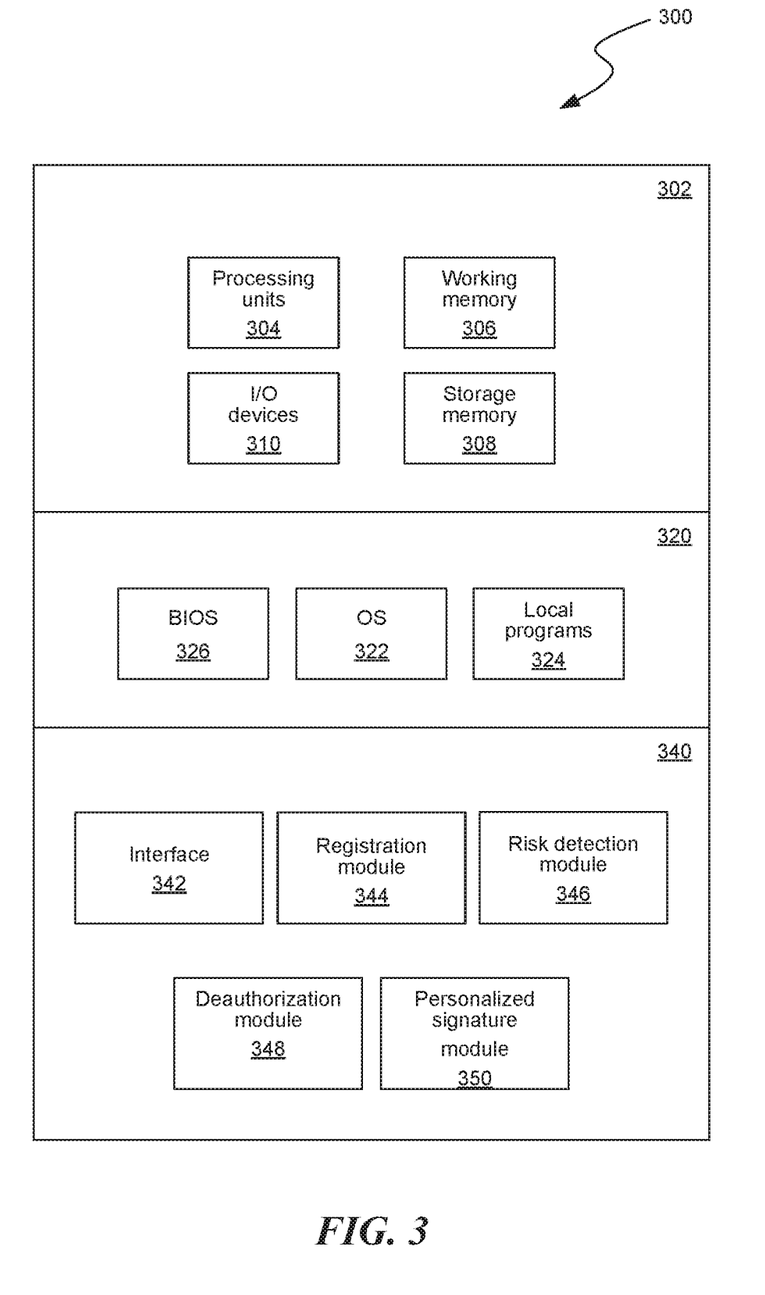
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in client computing devices such as UEs or on server computing devices or other computing devices associated with the 5G network.

General software 320 can include various applications, including an operating system 322, local programs 324, and a basic input output system (BIOS) 326. Specialized components 340 can be subcomponents of a general software application 320, such as local programs 324. Specialized components 340 can include registration module 344, risk detection module 346, personalized signature module 348, deauthorization module 350, and components that can be used for transferring data and controlling the specialized components, such as interface 342. In some implementations, components 300 can be in a computing system that is distributed across multiple computing devices or can be an interface to a server-based application executing one or more of specialized components 340.

Registration module 344 receives a registration request for a connected device to connect with or attach to the 5G network and registers the connected device with the 5G network. The connected device initiates communication with the 5G network to begin the registration process when, for example, the connected device is turned on or after a loss of communication with the 5G network. Once the connected device is attached to the network, the system can provide network access and services to the connected device. To attach, the connected device can perform a random access procedure to initiate communication and set up a connection with the gNB as well as send a Registration Request to the 5G core network. After security protocols are completed, the data and a default Protocol Data Unit (PDU) session is set up, the registration process is complete and data can flow in both the downlink and uplink directions.

Registration module 344 can store information regarding the connected device (e.g., type of device, software version, operating system) and the connected device's interaction (timing and duration of the interaction, ports or devices with which the connected device communicated, amount and type of data sent and received) in a database (e.g., Unified Data Management (UDM) database). In some implementations, such information is used to automatically create a device fingerprint of the device and/or by the personalized signature module 350 to create a personalized signature for the connected device. Such information can also be used by the risk detection module 346 to determine whether the connected device is at risk of a cyber-attack.

Risk detection module 346 detects or determines that the connected device is at risk of a cyber-attack using at least some of the information collected by registration module 340. Risk detection module 346 can further determine that the connected device is at risk of the cyber-attack by accessing information stored in the UDM database. The UDM database can store user profiles or device profiles that can include information relating to security such as device and manufacturer. The connected device is at risk of a cyber-attack when certain conditions are met or when a risk rating or score exceeds a threshold. For example, one or more of the following conditions can cause the connected device to be classified as at risk of a cyber-attack and/or to exceed a risk threshold: the connected device is detected as being obsolete or unmaintained (e.g., software or software version is out-of-date compared to other devices), the connected device is not responding to status checks, or the service provider associated with the connected device is not supporting the connected device or is out-of-business.

In some implementations, prior to determining that the connected device is at risk of a cyber-attack (e.g., when the device is registered), risk detection module 346 determines whether the connected device is potentially at risk of a cyber-attack and needs to be monitored more closely based on factors such as the provider of the device (e.g., has the provider been in business for less than a certain period of time), type of the device (e.g., historically has this type of device been vulnerable to cyber-attacks), and/or location of the device (e.g., connected devices in rural or remote areas are more at risk of a cyber-attack because they can more easily be hacked due to less resources being allocated to such areas). In some implementations, risk detection module 346 automatically creates a device fingerprint for the connected device when the connected device is located in an area classified by the 5G network as being rural or remote (e.g., an area under a certain population density). If a connected device has one or more factors indicating that the connected device is potentially at risk of a cyber-attack and should be monitored more closely, the system can allocate additional resources to monitor the connected device and can take precautions such as creating a personalized signature by personalized signature module 350 or using an existing personalized signature (e.g., created upon installation). Circumstances can change and thus so can the monitoring of the connected device. For example, a connected device provided by a company that has been in business less than a number of years (e.g., less than 5 years) can be monitored or other precautions can be taken while the provider is still under the five years in business. However, less frequent monitoring or no monitoring can be required if the provider is purchased by another company that has been in business for longer than five years or if the company surpasses the five-year threshold.

In some implementations, different portions of the 5G network can perform the monitoring based on system availability, location or source of the risk, or the portion of the 5G network most likely to perform deauthorization should it be required. For example, if the potential risk is caused by the provider of the connected device, resources (e.g., a computing device) associated with the core network can monitor the connected device as well as collect updates from news sources regarding a status (e.g., bankrupt, no longer in business, earnings reports) of the provider and will be the component of the 5G network to deauthorize the connected device. In another example, if the potential risk is caused by the location of the device (e.g., remote or rural), resources (e.g., computing device) associated with the RAN servicing the connected device can monitor the connected device and can deauthorize the connected device if the connected device is at risk of a cyber-attack. Thus, the system can dynamically allocate resources to monitor connected devices that are potentially at risk of a cyber-attack, update the risk assessment with new information and adjust resource allocation as circumstances evolve. The disclosed technology provides a technological benefit for at least this reason.

In response to the connected device being at risk of a cyber-attack as determined by risk detection module 346 based on the connected device meeting one of the conditions (e.g., software is obsolete or unmaintained, provider is out of business, other similar connected devices have been vulnerable to cyber-attacks), deauthorization module 348 can deauthorize the connected device. Prior to deauthorizing the connected device, deauthorization module 348 can categorize the risk of the cyber-attack based on factors such as severity and likelihood of the cyber-attack. Based at least in part on the categorization of the risk of the cyber-attack (e.g., high/medium/low risk, cause of the risk such as from an application vulnerability, fix or mitigate the risk such as disabling an application), deauthorization module 348 can determine a component of the 5G network to perform the deauthorizing (e.g., core network, RAN, application server) and a type of deauthorizing needed to address the situation (e.g., turning the connected device to an off state, erasing content and settings from the connected device, disabling an application on the connected device, or temporarily disabling access of the connected device to the 5G network).

Various components of the 5G network (e.g., core network, RAN) can perform the deauthorizing based on factors such as the category of the risk of the cyber-attack and a type of the deauthorizing. For example, should deauthorizing module 348 determine that the category of risk is high (e.g., a cyber-attack has been attempted, authentication attempts have failed), a resource associated with the core network can erase content and settings from the connected device and identify other similar or same connected devices and perform the same action for the other similar or same connected devices. In another example, if risk of a cyber-attack is medium and appears that disabling a certain application on the connected device would reduce or eliminate the risk, an application server associated with the 5G network can disable the application on the connected device. In some implementations, deauthorizing module 348 can temporarily disable access of the connected device to the 5G network but can restore access to the connected device upon determining that the connected device is no longer at risk of the cyber-attack. Deauthorization can be performed by various parts of the 5G network including the 5G Core Access and Mobility Management Function (AMF) and gNB.

In an implementation, the connected device is a cloud RAN node device that is interconnected together to provide 5G coverage in an area (e.g., remote area). Similar to the IoT devices, cloud RAN node devices such as devices in the baseband unit ("BBU") pool can become obsolete, unmaintained and pose a risk of cyber-attack and can be particularly vulnerable due to their role as transmitters and receivers without additional intelligence. If the 5G core network monitors the cloud RAN node device and determines there is a cyber-risk, the 5G core network can deauthorize the cloud RAN node device.

In an implementation, intelligent gNBs in the RAN can auto-scan, broadcast and deauthorize a connected device. For example, a gNB in the RAN can register a connected device, detect that the connected device is at risk of a cyber-attack (e.g., when the connected device meets conditions such as the connected device is obsolete or unmaintained) and can broadcast detection of the risk of the connected device to other gNBs in the RAN or communicate the message a specific gNB. A second gNB can send a message to the gNB confirming or acknowledging that the connected device is at a risk of the cyber-attack. The gNB or another component of the 5G network can deauthorize the connected device. The type of deauthorization can be determined by the level of risk the connected device poses and/or availability of resources. In some implementations, at least two of the gNBs need to confirm that the connected device is at risk of a cyber-attack before deauthorization occurs.

In some implementations, the gNB can send a message to the 5G core network with characteristics (e.g., port number, type of device, provider of the device, manufacturer of the device, software version) of the connected device detected as being at risk. The 5G core network can detect other connected devices with the same or similar characteristics and create a deauthorization plan for the other same or similar connected devices. The deauthorization plan can include identifying other RANs in communication with the other similar or same characteristics as the first connected device (e.g., all devices of the same make and model that are on the same software version) and send messages to the other RANs indicating the connected devices that are at risk of a cyber-attack. In some implementations, the other RANs can do further monitoring or can proceed with deauthorization of the identified devices.

Personalized signature module 350 creates a personalized signature for the connected device and the personalized signature can be used to detect that a connected device is at risk of a cyber-attack or used to prevent a cyber-attack when the connected device is at risk of a cyber-attack. Personalized signatures can be created by the system (e.g., creating a pattern for the connected device based on interactions with the 5G network) or created by the device itself (e.g., a passcode). In some implementations, personalized signatures are used for devices more likely to be at risk of a cyber-attack (e.g., devices physically located in an area classified as remote or rural by population density, devices sold for under a certain dollar amount). Once the connected device can access the 5G network, the system can store and monitor information relating to the connected device such as devices to which the connected device communicates with, when the connected device communicates with other devices, or amount and type of data being sent or received.

In some implementations, personalized signature module 350 can create the personalized signature for the connected device by detecting a pattern associated with the connected device. The pattern can be generated based on past interactions between the connected device and the 5G network (e.g., times when the connected device communicates with other devices, type of communications between the connected device and other devices, amount of data transmitted or received between the connected device and other devices). Once a baseline personalized signature is generated, the system can monitor the connected device to determine when the connected device deviates from the pattern and deauthorize the connected device. For example, deviating from the pattern can include communicating with other devices at vastly different times, transmitting a different amount of data, and other differences. In some implementations, to classify as a deviation, the deviation must be above a certain percentage different than the typical pattern. In some implementations, the system updates the personalized signature over time using machine learning.

Should the system determine that the deviation indicates that the connected device is at risk of a cyber-attack based on the deviations in the pattern, the system can deauthorize the connected device. In some implementations, a node in the RAN monitors the connected device and deauthorizes the connected device, though other components of the 5G network can monitor and deauthorize the connected device. Deauthorizing can include various types of deauthorization such as turning the connected device to an off state, erasing content and settings from the connected device, disabling an application on the connected device, or temporarily disabling access of the connected device to the 5G network. In some implementations, a detected deviation does not cause the deauthorization but rather cases deauthorization module 348 to evaluate or check other factors to determine whether conditions for deauthorization are met (e.g., software is obsolete or unmaintained, provider is out of business, other similar connected devices have been vulnerable to cyber-attacks). Deauthorizing can include various types of deauthorization such as turning the connected device to an off state, erasing content and settings from the connected device, disabling an application on the connected device, or temporarily disabling access of the connected device to the 5G network.

In some implementations, an alternative type of personalized signature can be used to detect that the connected device is at risk of a cyber-attack or used to prevent a cyber-attack when the connected device is at risk of a cyber-attack. For example, after the connected device is connected to the 5G network, personalized signature module 350 can request a personalized signature from the connected device. The personalized signature can vary with the type of connected device (e.g., thermostat will have a different personalized signature than a sprinkler system). Examples of a personalized signature include a globally unique ID (e.g., such as a serial number), a MAC address, an algorithmically generated identifier (e.g., a hash of two or three bits of information, such as a product ID and installation date). The personalized signature can be part of the device profile stored in UDM database. In some embodiments, a personalized signature can apply to a group of devices. Security policies can be applied (e.g., by the policy control function) to the devices based on their groupings. After the connected device creates the signature, personalized signature module 350 can receive the personalized signature and can maintain or store by the 5G network (e.g., in the Unified Data Repository and included in Unified Data Management). Personalized signature module 350 can manage the registration and session connectivity of the connected device when the connected device requests connection with the 5G network. In some implementations, personalized signature module 350 can send the personalized signature to other components of the 5G network (e.g., RAN).

Personalized signature module 350 can create a schedule for the personalized signature to be sent from the connected device to the 5G network. The schedule can include days or dates and times and can be communicated to the connected device. The frequency at which the personalized signature to be sent can be determined by a risk associated with the connected device. The risk associated with the connected device can be determined by factors such as a type of the connected device, a cost of the connected device, a location of the connected device, and a length of time the provider of the connected device has been in business.

Personalized signature module 350 can monitor for the personalized signature at times indicated in the schedule. When a personalized signature is received, the 5G network can compare the personalized signature with a personalized signature of the connected device stored in a database. In response to not receiving the personalized signature from the connected device at a scheduled time, risk detection module 348 can determine whether the connected device should be deauthorized and if it should be deauthorized, by which component and what type of deauthorization is required. In some implementations, risk determination module can determine that the deviation from the schedule should be used as a factor in determining that the connected device is at risk of a cyber-attack and begin a protocol to determine whether the connected device is at risk of a cyber-attack.

The personalized signature can be created by the connected device and provided to the 5G network when the connected device is registered with the 5G network. In some implementations, personalized signature module 350 sets a schedule detailing when the 5G network expects to receive the personalized signature from the connected device (e.g., the connected device is expected to send the personalized signature each hour on the hour). If the connected device does not send the personalized signature at the scheduled times, risk detection module 348 can determine whether the connected device should be deauthorized and if it should be deauthorized, by which component and what type of deauthorization is required. In some implementations, if the connected device is temporarily deauthorized and granted access later, the 5G network can create a new personalized signature for the connected device. The new personalized signature can be based on historical interactions between the 5G network and the connected device.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
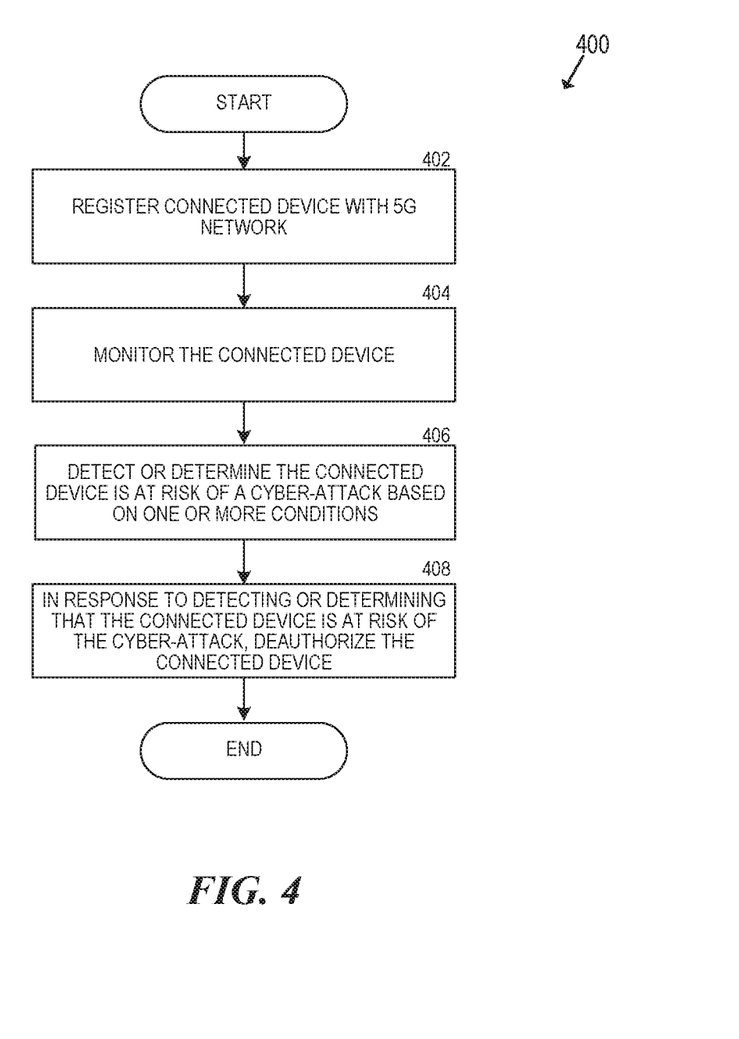
FIG. 4 is a flow diagram illustrating a process used in some implementations for protecting a 5G network from a cyber-attack.

FIG. 4 is a flow diagram illustrating a set of operations 400 for protecting a 5G network from a cyber-attack. Registering operation 402 receives a request to register a connected device (e.g., UE, cloud RAN node device) with a 5G network (e.g., attach the connected device). Monitoring operation 404 monitors the connected device. Detecting operation 406 detects or determines that the connected device is at risk of a cyber-attack based on one or more conditions. The conditions can include detecting that the connected device is obsolete or unmaintained, the connected device fails to respond to status checks, or a service provider associated with the connected device is not supporting the connected device or is out of business. Detecting operation 406 can further determine a category of risk of the cyber-attack (e.g., high/medium/low) and can determine the type of deauthorizing needed based in part on the category of the risk of the cyber-attack (e.g., turning the connected device to an off state, erasing content and settings from the connected device, disabling an application on the connected device, or temporarily disabling access of the connected device to the 5G network). Detecting operation 406 can further determine a component of the 5G network (e.g., application server, core network, RAN) to perform the deauthorizing. Deauthorizing operation 408 deauthorizes the connected device in response to detecting or determining that the connected device is at risk of the cyber-attack.

Figure 5:
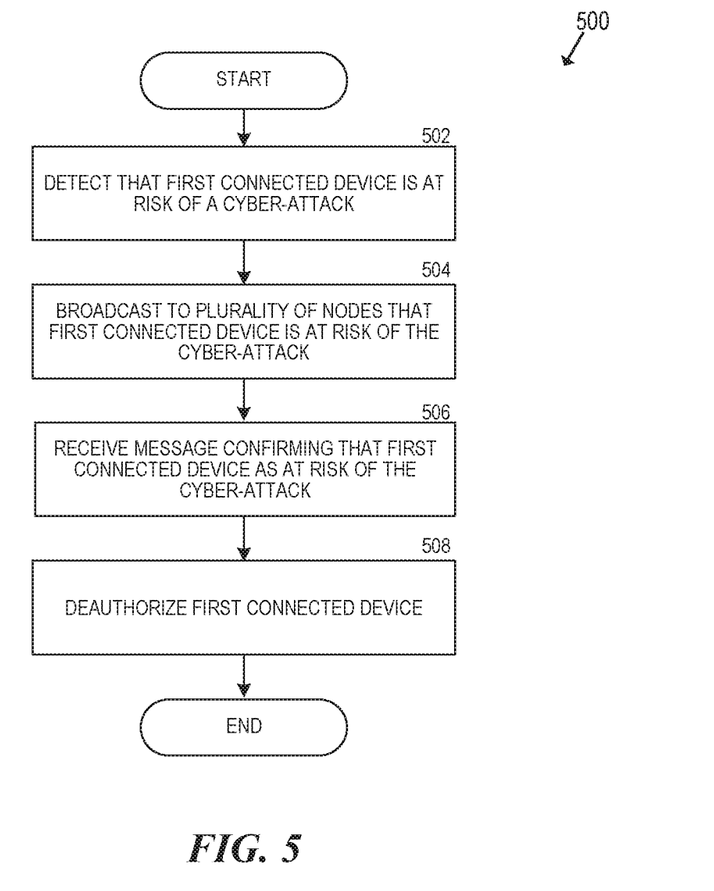
FIG. 5 is a flow diagram illustrating a process used in some implementations for using intelligent nodes to protect a 5G network from a cyber-attack.

FIG. 5 is a flow diagram illustrating a set of operations 500 for using intelligent nodes to protect a 5G network from a cyber-attack. Detecting operation 502 detects by a first node in a RAN that a first connected device is at risk of a cyber-attack based on a condition. Conditions can include detecting that the first connected device is obsolete or unmaintained, the first connected device fails to respond to status checks, or a service provider associated with the first connected device is not supporting the first connected device or is out of business. Broadcasting operation 504 broadcasts to other nodes in the RAN that the first connected device is at risk of the cyber-attack. Receiving operation 506 receives a first message from a second node in the RAN acknowledging or confirming the message that the first connected device is at risk of the cyber-attack. Deauthorizing operation 508 deauthorizes the first connected device. Deauthorizing can be determined by a category of risk of the cyber-attack and can include turning the first connected device to an off state, erasing content and settings from the first connected device, disabling an application on the first connected device, or temporarily disabling access of the first connected device to the 5G network.

Figure 6:
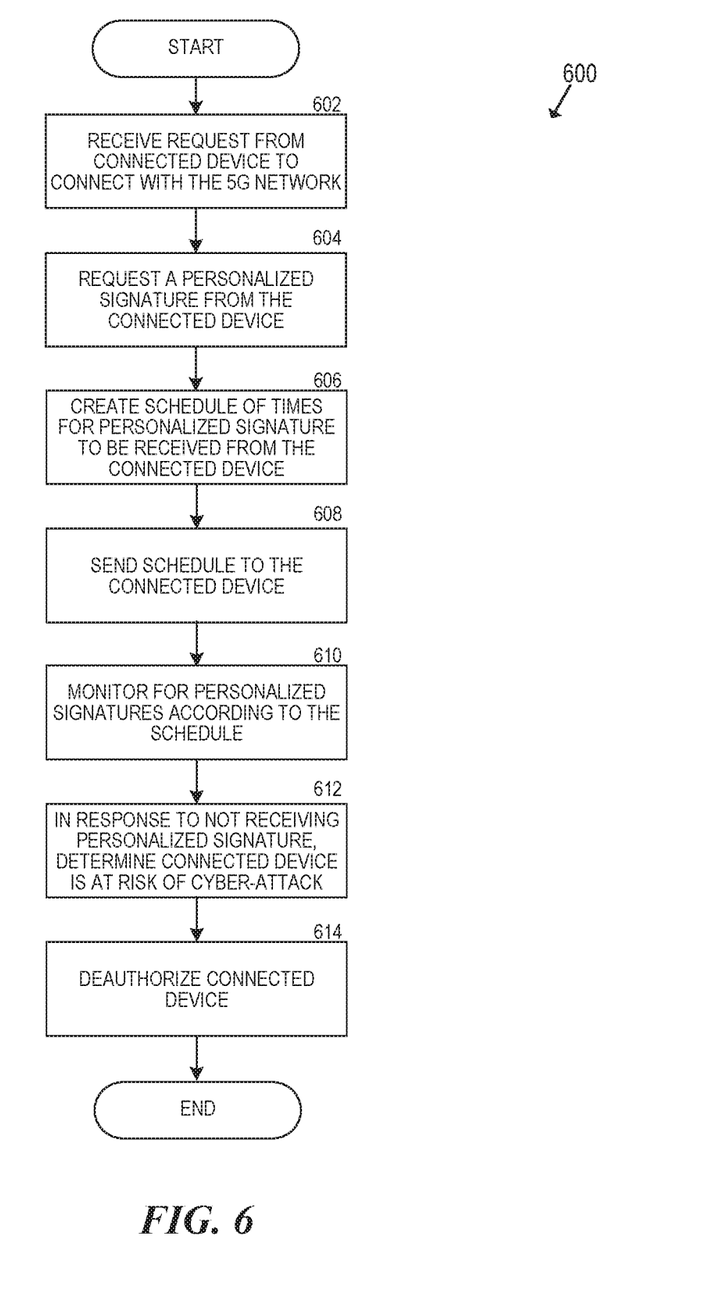
FIG. 6 is a flow diagram illustrating a process used in some implementations for using a personalized signature to protect a 5G network from a cyber-attack.

FIG. 6 is a flow diagram illustrating a set of operations 600 for using a personalized signature to protect a 5G network from a cyber-attack. Receiving operation 602 receives a request from a connected device (e.g., UE) to connect with the 5G network. Receiving operation 604 receives a personalized signature of the connected device from the connected device upon connection with the 5G network. Creating operation 606 creates a schedule (e.g., one or more of times, dates, days, months) that it expects to receive the personalized signature from the connected device. Sending operation 608 sends the schedule to the connected device. Monitoring operation 610 monitors the system for the personalized signatures at times/days/dates in the schedule. Determining operation 612 determines that the connected device is at risk of a cyber-attack in response to not receiving the personalized signature from the connected device. In some implementations, the system requires that the connected device miss a minimum number of scheduled personalized signatures before deauthorizing the connected device. This may help to avoid false positives such as when the UE is disconnected from power for a short time.

Figure 7:
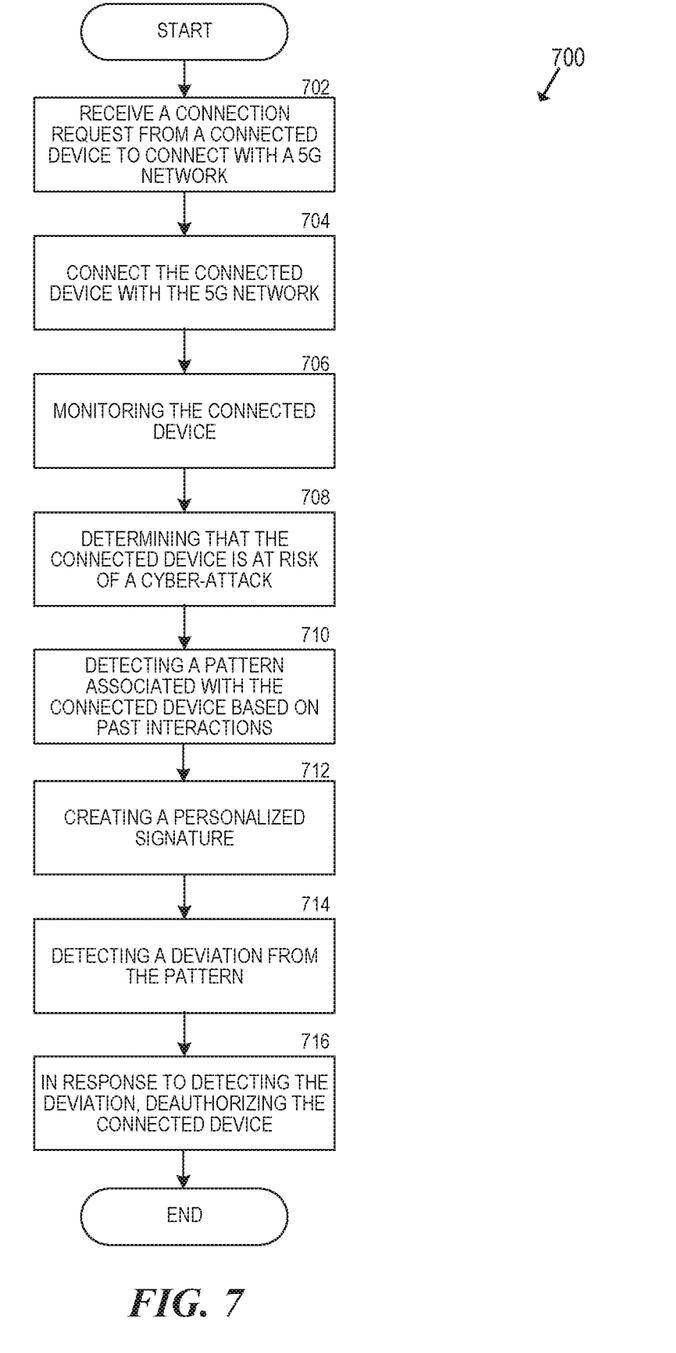
FIG. 7 is a flow diagram illustrating a process used in some implementations for using a personalized signature to protect a 5G network from a cyber-attack.

FIG. 7 is a flow diagram illustrating a set of operations 700 for using a personalized signature to protect a 5G network from a cyber-attack. Receiving operation 702 receives a connection request from a connected device to connect with a 5G network. Connecting operation 704 connects the connected device with the 5G network. Monitoring operation 706 monitors the connected device for potential risk of a cyber-attack. Determining operation 708 determines that the connected device is at risk of a cyber-attack. Detecting operation 710 detects a pattern associated with the connected device based (at least in part) on past interactions between the connected device and the 5G network in response to determining that the connected device is at risk of the cyber-attack. The pattern can include the times at which the connected device communicates with other devices or types of the other devices in which the connected device communicates. Creating operation 712 creates a personalized signature based on at least in part on the pattern. Detecting operation 714 detects a deviation in the pattern. Deauthorizing operation 716 deauthorizes the connected device in response to detecting the deviation.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A method of preventing or reducing cyber-attacks in a 5G network, the method comprising:
　registering a connected device with the 5G network,
　　wherein the registering is performed by a computing device associated with the 5G network;
　monitoring the connected device by the computing device associated with the 5G network;
　detecting or determining that the connected device is at risk of a cyber-attack based on one or more conditions,
　　wherein the one or more conditions include at least one of:
　　　detecting that the connected device is obsolete or unmaintained,
　　　the connected device fails to respond to status checks, or
　　　a service provider associated with the connected device is not supporting the connected device or is out of business; and
　in response to detecting or determining that the connected device is at risk of the cyber-attack, deauthorizing the connected device;
　　wherein deauthorizing the connected device incudes:
　　　determining a category of risk of the cyber-attack;
　　　determining, by the computing device associated with the 5G network, a type of deauthorizing based at least in part on the category of the risk of the cyber-attack,
　　　　wherein types of deauthorizing comprise:
　　　　　turning the connected device to an off state,
　　　　　erasing content and settings from the connected device,
　　　　　disabling an application on the connected device, or
　　　　　temporarily disabling access of the connected device to the 5G network; and
　　　determining a component of the 5G network to perform the deauthorizing of the connected device based at least in part on the type of deauthorizing.

2. The method of claim 1, wherein the type of deauthorizing comprises disabling the application on the connected device, and wherein the method further comprises:
　determining that the component of the 5G network to perform the deauthorizing of the connected device is an application server.

3. The method of claim 1, wherein deauthorizing the connected device comprises temporarily disabling access of the connected device to the 5G network, and wherein the method further comprises:

in response to determining that the connected device is no longer at risk of the cyber-attack, granting, to the connected device, access to the 5G network.

4. The method of claim 1, further comprising allocating resources within the 5G network to monitor the connected device based on a time of day and a physical location of the connected device.

5. The method of claim 1, wherein the service provider associated with the connected device is not supporting the connected device or is out of business, wherein the method further comprises:
identifying other connected devices associated with the service provider; and
deauthorizing the other connected devices associated with the service provider, wherein deauthorizing the other connected devices comprises erasing content and settings from the other connected devices.

6. The method of claim 1, wherein the connected device is one of a cloud Radio Access Network ("RAN") node device.

7. At least one non-transitory, computer-readable medium, storing instructions, which when executed by at least one data processor, performs a method of preventing or reducing cyber-attacks in a 5G network, the method comprising:
registering a connected device with the 5G network, wherein the registering is performed by a computing device associated with the 5G network;
monitoring the connected device by the computing device associated with the 5G network;
detecting or determining that the connected device is at risk of a cyber-attack based on one or more conditions, wherein the one or more conditions include at least one of:
detecting that the connected device is obsolete or unmaintained,
the connected device fails to respond to status checks, or
a service provider associated with the connected device is not supporting the connected device or is out of business;
in response to detecting or determining that the connected device is at risk of the cyber-attack, deauthorizing the connected device; and
allocating resources within the 5G network to monitor the connected device based on a time of day and a physical location of the connected device.

8. The at least one non-transitory, computer-readable medium of claim 7, wherein the method further comprises:
determining a category of risk of the cyber-attack;
determining, by the computing device associated with the 5G network, a type of deauthorizing based at least in part on the category of the risk of the cyber-attack, wherein the types of deauthorizing comprise turning the connected device to an off state, erasing content and settings from the connected device, disabling an application on the connected device, or temporarily disabling access of the connected device to the 5G network; and
determining a component of the 5G network to perform the deauthorizing of the connected device based at least in part on the type of deauthorizing.

9. The at least one non-transitory, computer-readable medium of claim 8, wherein the type of deauthorizing comprises disabling the application on the connected device, wherein the method further comprises:
determining that the component of the 5G network to perform the deauthorizing of the connected device is an application server.

10. The at least one non-transitory, computer-readable medium of claim 7, wherein deauthorizing the connected device comprises temporarily disabling access of the connected device to the 5G network, and wherein the method further comprises:
in response to determining that the connected device is no longer at risk of the cyber-attack, granting, to the connected device, access to the 5G network.

11. The at least one non-transitory, computer-readable medium of claim 7, wherein the connected device is a cloud Radio Access Network ("RAN") node device.

12. The at least one non-transitory, computer-readable medium of claim 7, wherein the service provider associated with the connected device is not supporting the connected device or is out of business, wherein the method further comprises:
identifying other connected devices associated with the service provider; and
deauthorizing the other connected devices associated with the service provider, wherein deauthorizing the other connected devices comprises erasing content and settings from the other connected devices.

13. A system for preventing or reducing cyber-attacks in a 5G network, the system comprising:
a memory;
a processor in communication with the memory, the processor operable to execute software modules, the software modules comprising:
a registration module configured to:
register a connected device with the 5G network, wherein the registering is performed by a computing device associated with the 5G network;
monitor the connected device by the computing device associated with the 5G network;
a risk detection module configured to
detect or determine that the connected device is at risk of a cyber-attack based on one or more conditions,
wherein the one or more conditions include at least one of:
detecting that the connected device is obsolete or unmaintained,
the connected device fails to respond to status checks, or
a service provider associated with the connected device is not supporting the connected device or is out of business;
a deauthorization module configured to:
deauthorize the connected device in response to detecting or determining that the connected device is at risk of the cyber-attack,
wherein deauthorizing the connected device comprises:
temporarily disabling access of the connected device to the 5G network, and
grant, to the connected device, access to the 5G network in response to determining that the connected device is no longer at risk of the cyber-attack.

14. The system of claim 13, wherein the deauthorization module is further configured to:
determine a category of risk of the cyber-attack;
determine a type of deauthorizing based at least in part on the category of the risk of the cyber-attack, wherein the types of deauthorizing comprise turning the connected device to an off state, erasing content and settings from the connected device, disabling an application on the connected device, or temporarily disabling access of the connected device to the 5G network; and determine a component of the 5G network to perform the deauthorizing of the connected device based at least in part on the type of deauthorizing.

15. The system of claim 14, wherein the type of deauthorizing comprises disabling the application on the connected device, wherein the deauthorization module is further configured to:

determine that the component of the 5G network to perform the deauthorizing of the connected device is an application server.

16. The system of claim 13, wherein the service provider associated with the connected device is not supporting the connected device or is out of business, wherein the deauthorization module is further configured to:

identify other connected devices associated with the service provider; and deauthorize the other connected devices associated with the service provider, wherein deauthorizing the other connected devices comprises erasing content and settings from the other connected devices.

17. The system of claim 13, wherein the deauthorization module is further configured to:

allocate resources within the 5G network to monitor the connected device based on a time of day and a physical location of the connected device.

* * * * *